Nov. 26, 1968  B. L. SHEAFFER ET AL  3,412,719

ENGINE STRUCTURE

Filed Dec. 6, 1966

INVENTORS
BENJAMIN L. SHEAFFER
JOHN H. BROOKS

BY Burns, Doane, Benedict,
   Swecker & Mathis

ATTORNEYS

United States Patent Office 3,412,719
Patented Nov. 26, 1968

3,412,719
ENGINE STRUCTURE
Benjamin L. Sheaffer, Palos Verdes, and John H. Brooks,
Encino, Calif., assignors to McCulloch Corporation,
Los Angeles, Calif., a corporation of Wisconsin
Filed Dec. 6, 1966, Ser. No. 599,579
10 Claims. (Cl. 123—73)

ABSTRACT OF THE DISCLOSURE

A pivot connection between a piston and a connecting rod having a flow path and means for inducing a flow of coolant through the flow path.

A method of prolonging the life of such a pivot connection by flowing a flow of coolant therethrough.

---

This invention relates to an improved engine structure. In particular it relates to a structural arrangement for cooling wrist-pin bearings disposed in the pivot connection between a piston and connecting rod of an internal combustion engine.

Background of the invention

In internal combustion engines, a connecting rod is often pivotally secured to a reciprocating piston by a pivot connection termed a wrist pin connection. Previously known wrist pin connections are disclosed, for example, in Sheaffer Patent 3,257,997 and in Brooks Patent 3,257,998.

The piston and cylinder structures featured in the Sheaffer and Brooks patents contain an improved arrangement for circulating a combustible and generally gaseous charge, including a lubricant, from a crankcase interior around portions of a piston and through passageways in a cylinder wall into the cylinder combustion chamber.

All this notwithstanding, it has been found that wrist pin connections in internal combustion engines are undesirably vulnerable to failure because of overheating of the bearings which connect wrist pins to piston bodies.

Summary of the invention

This invention is intended to provide an improved structure characterized by a hollow, open ended wrist pin in combination with means which positively induce a flow of cooling fluid through the wrist pin so as to cool wrist pin bearings and thereby prolong engine life.

As a consequence of using a gaseous charge of combustible material including a lubricant as the cooling fluid, and transmitting this fluid ultimately to a combustion chamber, the advantage of wrist pin cooling is combined with an augmented flow of a combustible gaseous charge to the combustion chamber so as to increase engine output.

A basic structure presented through the invention for yielding these advantages comprises a piston which is adapted to be mounted for reciprocation within the cylinder of an internal combustion engine, a connecting rod, and a pivot connection between the connecting rod and the piston. Wall means define a passage extending through the piston connection. Means are provided for inducing a flow of cooling fluid through this passage.

A basic method aspect of the invention entails the provision of a passage extending through a pivot connection between a piston and connecting rod. The characterizing feature of this method aspect of the invention entails the inducing of a flow of cooling fluid through the passage.

A related method aspect of the invention entails the transmission of this cooling fluid, which comprises an at least partially gaseous combustible charge from the cooling passage into a combustion chamber of an internal combustion engine.

Description of drawings

In describing the invention, reference will be made to preferred embodiments illustrated in the appended drawings; in the drawings.

Overall engine structure

Figure 1:
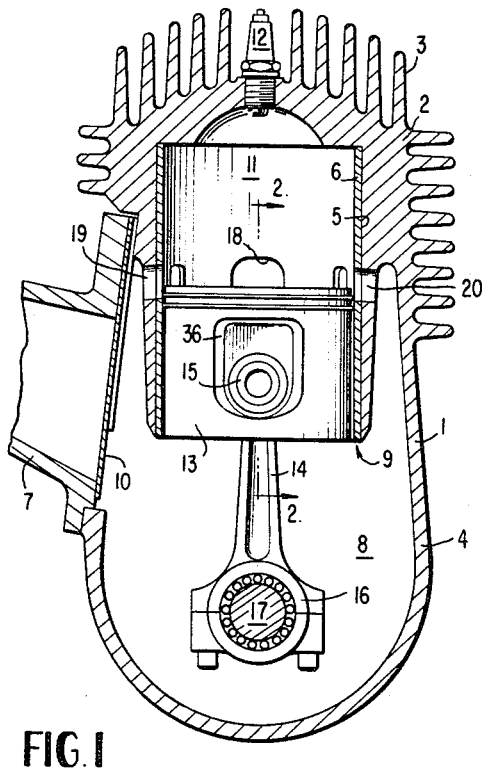
FIGURE 1 is a vertically sectioned, elevational view of a well known, two-cycle internal combustion engine modified to provide a flow of the combustible charge through the hollow interior of a wrist pin to a combustion chamber of the engine.

FIGURE 1 schematically illustrates a two-cycle, internal combustion engine 1. Engine 1 includes a conventional housing 2 provided with cooling fins 3. Housing 2 additionally includes a crankcase portion 4 and a cylinder defining portion 5. Cylinder 5 may be lined with a conventional cylinder liner 6 as schematically shown. A carburetor, not shown, supplies gaseous fuel through a branch conduit portion 7 of the housing to the interior 8 of the crankcase beneath the cylinder 5. As illustrated, cylinder 5 has an open lower end 9 which communicates with the crankcase interior 8.

The combustible charge supplied through the branch conduit 7 ordinarily will comprise a mixture of air, gasoline and a lubricant such as oil. The oil and gas will be dispersed through, and carried by, the air portion of the charge. A conventional reed valve mechanism 10 serves as a check valve to admit the combustion charge to the crankcase interior 8 while preventing a back flow of the combustion charge from the crankcase interior 8 back into the by-pass conduit 7.

In a conventional fashion, crankcase 8 defines a closed chamber, with the only outlet means from the chamber 8 comprising fuel inlets communicating with a combustion chamber portion 11 of cylinder 5.

A conventional spark plug 12 is provided to ignite the combustion charge within the chamber 11. A piston 13 is reciprocally mounted within cylinder liner 5. A connecting rod 14 is pivotally connected to the end of the piston 13 which faces away from the combustion chamber 11 by a pivot connection 15. The pivot axis of connection 15 is perpendicular to the direction of reciprocation of the piston 13 and generally aligned with a median plane of the cylindrical cylinder 5. The lower end of connecting rod 14 is secured by a pivot connection 16 to a conventional crank shaft 17.

Pivot connection 16 may comprise an annular assembly of needle bearings as schematically shown in FIGURE 1.

Figure 3:
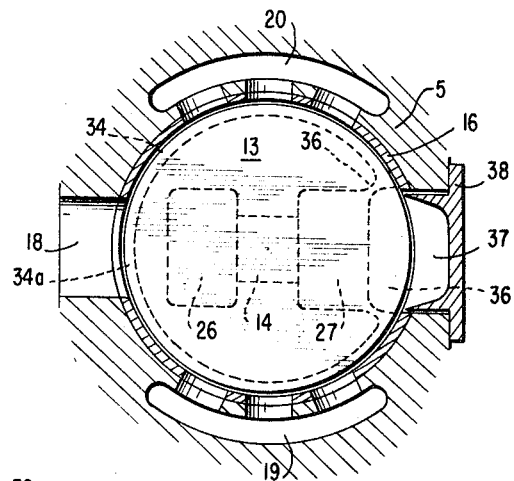
FIGURE 3 provides a vertically sectioned plan view of the FIGURE 1 apparatus as viewed along the stepped section line 3—3 of FIGURE 2.

Burned fuel is exhausted from combustion chamber 11 through an exhaust port 18 extending through the wall of cylinder 5, as generally shown in FIGURES 1 and 3. Fuel is supplied to the interior of combustion chamber 11 through port arrangements 19 and 20 which may be disposed on diametrically opposed sides of the cylinder 5 as illustrated in FIGURES 1 and 3.

Engine 1 operates in the conventional manner of a reed valve controlled, two-cycle internal combustion engine. Thus, during an upstroke of the piston 13 shown in FIGURE 1, a low pressure or vacuum condition is created in crankcase interior 8 which causes the reed valve 10 to open and admit a quantity of a gaseous combustion mixture into the interior 8. After the piston 13 has moved upwardly so as to pass the fuel inlet and burned charge outlet ports of the cylinder 5, fuel which had been previously introduced through the inlet ports 19 and 20 into the combustion chamber 11 is compressed. As the piston 13 reaches the upper end of the combustion chamber 11, the spark plug 12 fires so as to ignite the compressed charge of combustible material. The pressure generated by the burning charge causes the piston 13 to move downwardly and impart rotary force to the crank shaft 17 through the connecting rod 14. In this connection, it will be appreciated that the portion of the connecting rod 17 shown in FIGURE 1 comprises a segment which is radially offset from the axis of rotation of the crank shaft.

As the piston 13 moves downwardly so as to uncover the exhaust port 18, the burned combustion charge is able to move through the exhaust 18 out of the combustion chamber 11. Subsequent to the time that the port 18 is uncovered, the fuel inlets 19 and 20 are opened.

The downward movement of the piston 13 serves to pressurize the fresh charge of combustion material drawn into the crankcase interior 8, because of the lower end of the piston 13 being in direct communication with the closed interior space 8. The compressed, fresh combustion charge within space 8 flows through the inlet ports 19 and 20 during the downward stroke of the piston 13 after these inlet ports have been uncovered. The combustion charge entering the chamber 11 serves to facilitate the terminal displacement of the previously burned combustion charge.

The exhaust port 18 will ordinarily be uncovered prior to the uncovering of the fuel inlet ports so that the pressure within the combustion chamber 11 may be reduced sufficiently to allow the fresh fuel charge to enter the combustion chamber.

*Improved wrist pin and bearing structure*

Figure 2:
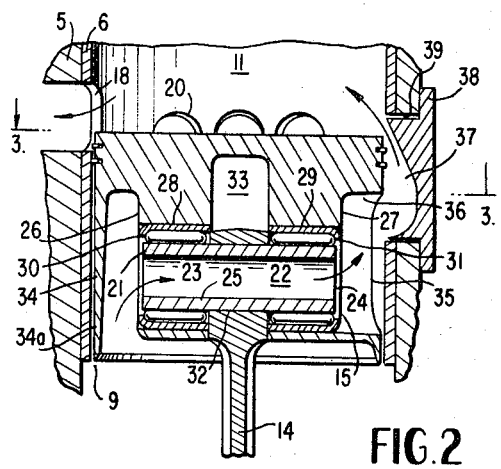
FIGURE 2 provides a transverse and enlarged sectional view of a piston and cylinder of the portion of the FIGURE 1 apparatus, as viewed along the section line 2—2.

FIGURES 1, 2 and 3 schematically illustrate structural details of the improved, automatically cooled, wrist pin connection 15.

Connection 15 includes a hollow, tubular, connecting or wrist pin 21. Pin 21 is cylindrical in character and includes a hollow central passage 22 having open opposite ends 23 and 24, as defined by a cylindrical wall 25. Depending downwardly from the undersurface of the piston 13 are a pair of lugs 26 and 27. Lugs 26 and 27 are apertured. The apertures 28 and 29 of mounting ears 26 and 27 are coaxially aligned with the axis of tubular wrist pin 21 which defines the pivot axis of the connection 15.

One end of tubular member 21 is secured within aperture 28 by a conventional, annular, needle bearing assembly 30. The opposite end of the tubular member 21 is pivotally mounted within the aperture 29 by another annular needle bearing assembly 31. Needle bearing assemblies 30 and 31 may be press-fitted within the apertures 28 and 29, respectively. Bearing assemblies 30 and 31 may comprise conventional needle bearing assemblies having needles, the ends of which are exposed to the interior of space 8, at each of the opposite axial ends of the bearing.

Tubular body 21 is telescopingly received within an opening 32 at the upper end of connecting rod 14. This connecting rod opening is disposed in the space 33 which is located axially between openings 28 and 29. Tubular wrist pin 21 is press fitted within opening 32 so as to be, in essence, rigidly mounted in relation to the connecting rod 14.

Piston 13 is provided with an imperforate side wall portion 34 which extends from a location spaced radially outwardly from opening 28 around to the general vicinity radially opposite opening 29. Cylinder wall portion 34 includes a recess or opening 35 which is radially adjacent wrist pin receiving opening 29. This recess is defined by continuous wall means 36 which encircles and extends generally radially outwardly from mounting lug 27. As will be appreciated, wall 36 thus defines an enclosed recess 35 communicating with the central passage 22 and with the radially outermost periphery of the piston 13.

Cylinder 5 is provided with a recess 37 extending generally radially outwardly of the combustion chamber 11. Recess 37 may be provided by a separate recessed plate 38 which is welded to the cylinder body, with the recess 37 occupying and closing a cylinder opening 39.

Figure 4:
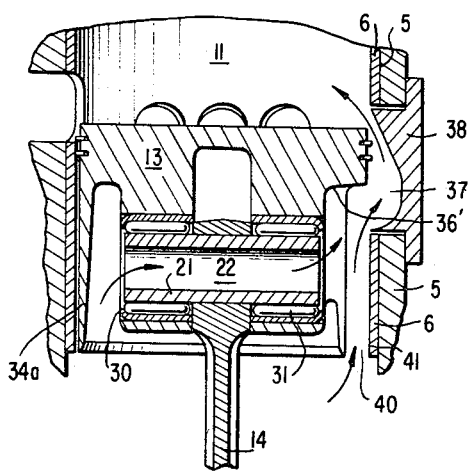
FIGURE 4 provides an elevational, sectioned view of a modified form of the apparatus shown in FIGURE 1, as viewed in a direction corresponding to the view direction of FIGURE 2.

FIGURE 4 illustrates a modified embodiment of the invention which is identical to that shown in FIGURE 2 except that the wall means 36 is altered to provide a lower opening communicating with the crankcase interior 8. Thus, as shown in FIGURE 4, the modified wall 36' defines a piston recess which is closed on its top and sides but which is open at its lower end so as to define a passage 40 extending between the bearing 31 and the radially adjacent wall portion 41 of cylinder 5.

In each of the embodiments shown in FIGURES 2 and 4, the cylinder wall recess 37 is disposed in generally radial alignment with a median plane extending longitudinally of the cylinder 5, which plane is coaxial with the center or pivot axis of the tubular wrist pin 21 and the exhaust port 18.

In each of these two embodiments, the recess 37 is disposed in substantially the same elevation as the inlet ports 19 and 20.

*Cooling and lubricating of wrist pin and augmenting of combustion charge*

In the FIGURE 2 embodiment, during the downward stroke of the piston 13, and while the piston recess 35 is aligned with the cylinder recess 37 and the cylinder recess 37 is in communication with the combustion chamber 11, the fuel within the crankcase space 8 flows into the combustion chamber 11 through the conventional inlet ports 19 and 20. Additionally, fuel flows into chamber 11 through the wrist pin passage 22 and the extension of this passage defined by the at least partially aligned recesses 35 and 37. This flow of fresh combustible material is relatively cool, and in passing through the passage 22, it serves to cool the wrist pin needle bearing assemblies 30 and 31.

In addition to the reduction in the operating temperature of these bearings, the tendency for the bearing 30, which is in closest proximity to the exhaust port 18, to be heated to a temperature hotter than that of the more remotely located bearing 31, is offset. In other words, the cooling flow of the combustion charge tends to both reduce the operating temperatures of the wrist pin bearings 30 and 31 and maintain them at more nearly the same operating temperature.

Because of the open ended character of the wrist pin bearings 30 and 31, the lubricant carrying combustion charge will serve to lubricate the needles of the bearings 30 and 31 by carrying lubricant into the interior of these bearings.

The auxiliary fuel flow path provided by the passage 22 and the recesses 35 and 37, provides a greater weight of fuel within the combustion chamber 11 than would be provided by the conventional inlet ports 19 and 20 alone. Thus, a demonstratably greater power output from the engine 1 is obtained.

With reference to the FIGURE 2 embodiment, it should be noted that access to the inlet recess 37 is obtainable only by way of the tubular passage 22 and the piston recess 35. Thus, during the downward stroke of the piston 13, the pressure differential between combustion chamber 11 and crankcase space 8 will positively induce a flow of cooling fuel through the wrist pin connection 15.

In the FIGURE 4 embodiment, because of the opening 40 which communicates directly with the crankcase interior 8, pressurized fuel within the crankcase space 8 may both flow through the wrist pin passage 22 and through the passage 40 to enter the combustion chamber 11 through the cylinder recess 37. However, it will be realized that the flow of fuel through the space 40 will inherently, through an aspiration effect, create a pressure differential longitudinally across the passage 22 so as to induce a cooling flow of fuel through the passage 22 toward the cylinder recess 37.

The FIGURE 4 embodiment, because of the additional flow path 40, is capable of delivering a greater weight of fuel per piston stroke to the combustion chamber 11 than the FIGURE 2 embodiment is capable of delivering. This advantage is off-set to some extent by the reduced cooling of the connection 15 resulting from the reduced fuel flow through the passage 22 of the FIGURE 4 embodiment. Where the maximum level of wrist pin cooling is desirable, the FIGURE 2 embodiment would be employed.

A significant feature of the invention, which is common to both the FIGURE 2 and the FIGURE 4 embodiments, resides in the utilization of a cylinder side wall as a solid heat shield or barrier between the exhaust port and the generally radially adjacent end of the connection 15. This heat shield, which is provided by piston wall portion 34A spaced radially outwardly from bearing 30, effectively shields bearing 30 from the hot exhaust gases passing through exhaust port 18.

Summary of advantages and scope of invention

A principal advantage of the invention entails the cooling of the wrist pin bearings as a consequence of the flow of the fresh combustion charge through a hollow passage in the wrist pin.

Additional thermal protection for the wrist pin connection is provided by a portion of the piston side wall which is generally radially interposed between an exhaust outlet and a nearby wrist pin bearing.

It should also be appreciated that this thermal protection tends to equalize the operating temperatures of the spaced wrist pin bearings so as to eliminate stresses which might be produced by a temperature differential between the spaced bearing assembly.

In test runs, this thermal protection for a wrist pin connection has been found to produce unexpectedly significant results. With conventional wrist pin structures, wrist pin bearing failures often occurred so as to determine and limit operating life of the engine. With the improved wrist pin structures of the present invention, wrist pin bearing life has increased by a factor of two or more, with failure being determined by engine components other than wrist pin connections.

The transmission of the coling flow of fuel to the combustion chamber to augment the fuel charge has been found, in practice, to produce a demonstrable power increase.

It is noteworthy that these advantages are obtained with a structural arrangement that does not require extensive or radical alteration of a basic engine structure and which effectively utilizes the available fuel as a cooling medium.

In describing the invention, reference has been made to preferred structural embodiments. However, those killed in the engine art and familiar with the disclosure of this invention may well recognize additions, deletions, substitutions or other modifications which would fall within the scope of the invention, as defined in the appended claims.

We claim:

1. An improved structure for an internal combustion engine, said structure comprising:
   a piston mounted for reciprocation within the cylinder of an internal combustion engine;
   said piston including
      piston head wall means extending transversely of the axis of said reciprocation, and
      piston side wall means extending generally axially of said axis of reciprocation generally adjacent said cylinder;
   a connecting rod;
   a pivot connection between said connecting rod and said piston;
   wall means defining a passage extending through said pivot connection;
   means, including said piston, for inducing a flow of cooling fluid through said passage of said pivot connection;
   means supplying said cooling fluid for passage through said pivot connection;
   an engine crankcase disposed in fluid communicating relation with said passage;
   said means supplying said cooling fluid being operable to deliver said cooling fluid to the interior of said engine crankcase;
   said means for inducing a flow of cooling fluid being operable to compress fluid within the interior of said crankcase and thereby cause at least a portion of said cooling fluid to move directly from said engine crankcase into and through said passage;
   bearing means mounted in said pivot connection and having at least one end disposed in fluid communicating relation with said engine crankcase;
   substantially the entire axial extremity of said one end of said bearing means being disposed generally in the path of fluid flowing from said engine crankcase toward said passage and generally facing said flowing fluid;
   said piston side wall means being disposed at a radial location spaced generally radially outwardly from the radial location of said bearing means to define a fluid flow path leading from said engine crankcase to said passage and said axial extremity of said one end of said bearing means.

2. A structure as desrcribed in claim 1:
   wherein said structure includes valve means between said piston and the cylinder within which it is reciprocably mounted, said valve means being adapted to sequentially establish fluid communication between a combustion chamber of said cylinder and said passage;
   wherein said means for supplying cooling fluid is adapted to supply a combustible fluid; and
   wherein said structure includes wall means providing substantially closed fluid communication between the passage of said pivot connection and said combustion chamber.

3. An improved piston structure comprising:
   a piston body;
   said piston body including
      piston head wall means extending transversely of the axis of reciprocation of said piston body, and
      piston side wall means extending generally axially of said axis of reciprocation;
   a connecting rod;
   a pivot connection between said connecting rod and said piston body;
   wall means defining a passage extending through said pivot connection;
   a cylindrical side wall portion of said piston body providing a port communicating with one end of said passage;
   closed side wall means comprising a portion of said piston side wall means carried by said piston body and defining a heat shield spaced radially outwardly of the opposite end of said passage and radially outwardly of said pivot connection;

an engine crankcase disposed in fluid communicating relation with said passage;

means supplying cooling fluid to the interior of said engine crankcase;

said piston body operable to compress cooling fluid within the interior of said engine crankcase and thereby cause at least a portion of said cooling fluid to move directly from said engine crankcase into and through said passage; and bearing means mounted in said pivot connection and having at least one end disposed in fluid comunicating relation with said engine crankcase;

substantially the entire axial extremity of said one end of said bearing means being disposed generally in the path of fluid flowing from said engine crankcase toward said passage and generally facing said flowing fluid;

said piston side wall means being disposed at a radial location spaced radially outwardly from the radial location of said bearing means to define a fluid flow path leading from said engine crankcase to said passage and said axial extremity of said one end of said bearing means.

4. An improved piston structure as described in claim 3 and further including wall means defining an enclosed, generally radial extension, of said pivot connection passage extending to said port of said cylindrical side wall portion of said piston.

5. An improved two-cycle internal combustion engine, said engine comprising:

a cylinder;

a piston mounted for reciprocation within said cylinder;

a connecting rod;

a pivot connection between said connecting rod and said piston;

wall means providing a passage extending through said pivot connection;

an exhaust port in a wall portion of said cylinder;

an auxiliary fuel inlet disposed in another wall portion of said cylinder generally diametrically opposite said exhaust port and comprising a generally outwardly extending recess in an inner portion of said cylinder;

main fuel inlet means disposed in said cylinder circumferentially intermediate said exhaust port and said auxiliary fuel inlet;

said wall means comprising a tubular member having an axis generally perpendicular to the reciprocation direction of said piston, with said axis being disposed in a plane extending radially of said exhaust port and said fuel inlet;

a peripheral opening in said piston communicating with the pasage defined by said tubular member, said peripheral opening coacting with said fuel inlet to define a slide valve;

an imperforate side wall portion of said piston spaced radially outwardly of said tubular member and disposed generally radially between said exhaust port and said tubular member;

a crankshaft pivotally connecting with said connecting rod;

a crankcase body connected with said cylinder, enclosing said crankshaft and having an interior communicating with the passage defined by said tubular member and with an end of said piston; and valve means for admitting at least a partially gaseous combustible fluid to the interior of said crankcase for transmission of said passage and to said main fuel inlet means; and means operable to deliver lubricant and fuel containing cooling fluid to the interior of said engine crankcase;

said piston being operable to compress fluid within the interior of said crankcase and thereby cause said cooling fluid to move directly from said engine crankcase into and through said pasage.

6. A method of cooling a pivot connection between a piston rod and a piston of an engine, said method comprising:

providing a passage extending through a pivot connection between a piston and a piston rod of an engine;

locating bearing means in said pivot connection having at least one end disposed in fluid communicating relation with said engine crankcase;

delivering a flow of cooling fluid to the interior of a crankcase of said engine;

maintaining said interior of said crankcase in fluid communicating relation with said passage;

pressurizing said cooling fluid within said crankcase interior so as to induce at least a portion of the cooling fluid therein to flow from said crankcase interior directly to and through said passage;

constraining said cooling fluid to flow from said engine crankcase toward said piston along a fluid flow path located in part radially outwardly of said axial extremity of said one end of said bearing means and leading to said passage; and maintaining substantially the entire axial extremity of said one end of said bearing means generally in the path of cooling fluid flowing from said engine crankcase toward said passage and generally facing said flowing fluid.

7. A method as described in claim 6 wherein said cooling fluid comprises a combustible and at least partially gaseous fluid containing a lubricant.

8. A method of cooling a pivot connection between a piston and a piston rod of an engine, said method comprising:

providing a passage through a pivot connection between a piston and a piston rod of an engine;

providing valve means between said piston and a cylinder of said engine within which the piston moves to sequentially place said passage in communication with a combustion chamber of said cylinder;

placing said passage in substantially closed fluid communication with said valve means;

delivering cooling fluid to the interior of a crankcase of said engine;

locating bearing means in said pivot connection having at least one end disposed in fluid communicating relation with said cooling fluid in said engine crankcase;

maintaining the interior of said engine crankcase in fluid communicating relation with said passage;

pressurizing cooling fluid within said crankcase interior in response to reciprocating movement of said piston with said pressurization of said cooling fluid being operable to cause at least a portion of said cooling fluid to flow from said crankcase interior consecutively through said passage means and valve means to said combustion chamber;

constraining said cooling fluid to flow from said engine crankcase toward said piston along a fluid flow path located in part radially outwardly of said axial extremity of said one end of said bearing means and leading to said passage; and maintaining substantially the entire axial extremity of said one end of said bearing means generally in the path of cooling fluid flowing from said engine crankcase toward said passage and generally facing said flowing fluid.

9. A method as described in claim 8 wherein said cooling fluid comprises a combustible and at least partially gaseous fluid containing a lubricant.

10. An improved two-cycle internal combustion engine, said engine comprising:

a cylinder;

a piston mounted for reciprocation within said cylinder;
a connecting rod;
a pivot connection between said connecting rod and said piston;
wall means providing a passage extending through said pivot connection;
an exhaust port in a wall portion of said cylinder;
a fuel inlet disposed in another wall portion of said cylinder generally diametrically opposite said exhaust port and comprising a generally outwardly extending recess in an interior portion of said diametrically opposite portion of said cylinder;
said wall means comprising a tubular member having an axis generally perpendicular to the reciprocation direction of said piston, with said axis being disposed in a plane extending radially of said exhaust port and said fuel inlet;
a peripheral opening in said piston communicating with the passage defined by said tubular member, said peripheral opening coacting with said fuel inlet to define a slide valve;
an imperforate side wall portion of said piston spaced radially outwardly of said tubular member and disposed generally radially between said exhaust port and said tubular member;
a crankshaft pivotally connecting with said connecting rod;
a crankcase body connected with said cylinder, enclosing said crankshaft and having an interior communicating with the passage defined by said tubular member and with an end of said piston; and
valve means for admitting at least a partially gaseous combustible fluid to the interior of said crankcase for transmission to said passage;
said pivot connection including annular needle bearing means encircling an end of said tubular member facing said imperforate side wall portions of said piston, with said annular bearing means being mounted on a portion of said piston facing the interior of said crankcase and having an open end exposing the needle bearing of said bearing means, and facing said imperforate side wall portion of said piston; and
said piston including wall means providing a substantially closed passage continuation extending between the passage of said tubular member and an outer cylindrical side wall portion of said piston.

References Cited

UNITED STATES PATENTS

| | | | |
|---|---|---|---|
| 2,782,777 | 2/1957 | Jasper | 123—73 |
| 2,899,946 | 8/1959 | Lyvers | 123—41.38 X |
| 3,257,997 | 6/1966 | Sheaffer | 123—73 |

MARTIN P. SCHWADRON, *Primary Examiner.*